May 24, 1966  F. VERES ET AL  3,252,364
PROCESS AND DEVICE FOR CUTTING UP METAL BARS AND METAL WIRES
Filed June 9, 1964  2 Sheets-Sheet 1

INVENTORS
FERENC VERES
GERGELY VERES
By Irwin J. Thompson
ATTY.

May 24, 1966     F. VERES ET AL     3,252,364
PROCESS AND DEVICE FOR CUTTING UP METAL BARS AND METAL WIRES
Filed June 9, 1964     2 Sheets-Sheet 2

INVENTORS
FERENC VERES
GERGELY VERES
By Irwin S. Thompson
ATTY.

United States Patent Office 3,252,364
Patented May 24, 1966

3,252,364
PROCESS AND DEVICE FOR CUTTING UP METAL BARS AND METAL WIRES
Ferenc Veres and Gergely Veres, both of Budapest, Hungary, assignors to Nikex Nehézipari Külkereskedelmi Vállalat, Budapest, Hungary
Filed June 9, 1964, Ser. No. 373,676
5 Claims. (Cl. 83—14)

Sawing is a commonly used method for the cutting up of metal bars and metal wires. The disadvantage of this method of cutting is that in the case of thin metal bars to be cut up into small bodies, productivity is low and there is a great loss of material. A further disadvantage of this method is that the cut face is not so smooth as is produced in the case of work pieces to be shaped by cold plastic deformation.

It is in fact known that higher standards are expected for the surface evenness of work pieces which are to be worked by cold plastic deformation than is generally the case since only such finished products with satisfactory surface quality, shape and corresponding mass can be produced in this manner. However a satisfactory surface finish can be produced on metal pieces when the cutting up is carried out by machining instead of sawing. This machining, generally carried out on lathes or similar machines, is however very expensive and is associated with high losses of material.

Another known method of cutting up is by shearing. This method is satisfactory from the economic point of view but the surface quality is not suitable for working by cold plastic deformation. Pieces of metal produced by shearing not only have coarse faces adjacent to the plane of shear, but also the whole metal body is deformed. This is because machine tools that work by shearing at first deform the metal by pressing the outer face into the body of the material and only after this there follows the tearing of the adjacent faces along the plane of shear. Another disadvantage of cutting up by shearing is that the shear faces are concave and therefore the surface of the metal body is coarse and the weight of different bodies varies. This circumstance is disadvantageous for the further shaping of work pieces to be subjected to plastic deformation since owing to the deficiency or surplus of material of the initial body of metal faulty final products are produced.

In view of the high standards expected of metal bodies to be shaped by cold plastic deformation, the initial work pieces or blanks are mostly made from sheets or bands of metal by pressing. The great disadvantage of this process is the high loss of material. Thus commonly the loss can be as much as 50% and generally a loss of 30 to 40% is to be reckoned with. Since non-ferrous metals are largely used for shaping by cold deformation, the loss due to this waste is substantial from the economic point of view.

In accordance with the invention the disadvantages and deficiencies accruing from the use of known processes are avoided. The process in accordance with the invention and the apparatus make possible the cutting up of metal bars almost without any loss of material and moreover the smoothness of the surfaces of the metal bodies produced can satisfy the most exacting demands. Thus such metal bodies can be further shaped either by cold plastic deformation or by another process without any intermediate treatment. They can also be used for constructional purposes without any further treatment and/or preparation. For example components for electrical switches and electrical measuring devices can be produced ready for assembly in accordance with the process of the invention.

An important advantage of the invention consists in that it can be applied to the cutting up of metal bars of any desired shape since when it is used the outer face of the metal work pieces are not deformed.

The essence of the process in accordance with the invention is that a metal bar, at least in the length of it which is to be cut up, is subjected to a mechanical load during the cutting up and this mechanical load is equal to or greater than the load necessary to cause the material to flow. During the application of the load the metal bar is cut into one or more pieces along shear planes which are preferably perpendicular to the axis of the metal bar. During the process the necessary load can be applied to the metal bar to be cut up along the longitudinal axis of the bar or in a direction parallel to this longitudinal axis. The load can also be a transverse one. In order to apply the load to the metal bar to be cut up it is possible to apply two forces acting in a direction parallel to the longitudinal axis and/or in the transverse direction.

The apparatus in accordance with the invention comprises a device subjecting the metal bar which is to be cut up to a load, two securing devices for maintaining the action of the load during the cutting action, and one or more such cutting devices which surround the body to be separated around its outer face.

The process in accordance with the invention and the device are now described with reference to the illustrative embodiments shown in detail in the attached drawings.

Figure 1:
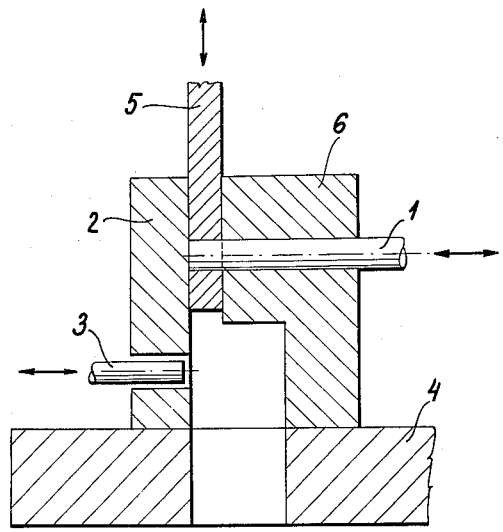
FIGURE 1 shows schematically a device for separating a single body.

In accordance with FIGURE 1 the metal bar 1 in the tensioning device 6 rests against the abutment plate 2 fixed to the base 4. Between the abutment plate 2 and the tensioning device 6 there is a cutting up device 5 which is arranged so that it can slide. This cutting up device 5 has a hole for receiving the end of the metal bar.

During the cutting up of the metal bar 1, the bar is pressed along its axis or in a direction parallel to its axis by the loading device 6 against the abutment plate 2 and then the cutting device 5 is moved downwards. When this happens the part of the bar in the hole of the cutting device 5 moves in relation to the part of the bar in the loading device along the plane between the devices 5 and 6 and there therefore occurs a separation of the part in the cutting device 5. During the further downward movement of the cutting device, when the axis of the metal body in this device reaches the axis of the ejecting device 3, the axially movable ejecting bar moves to the right and shoves the separated metal body from the hole in the cutting device 5 and the body falls through the recess in the base 4 into the collecting position. Immediately the ejector bar 3 is moved back into its position shown in the drawing, the cutting device 5 is lifted back into its original position and then the metal bar 1 is shoved forwards against the abutment plate 2. After pressure has again been applied to the bar 1 it can be cut again.

As will be seen from the description of the process, cutting occurs through shearing but during the state of cold deformation of the material due to the axial force exerted on the bar 1, the force required for the shearing is substantially less than in the conventional method of shearing. Cold deformation is caused on the one hand through the load applied as the loading device 6 presses the bar against the abutment plate 2 and on the other hand owing to the radial pressure of the tensioning device and possibly also through a torsional load resulting from the pressure which causes the end of the bar to be jammed in the cutting device 5 so as to cause twisting.

In carrying out the process in accordance with the invention it is essential that the holes or hollows of the loading device 6 and of the cutting device 5 should correspond exactly to the size and cross section of the bar. When this is done the surface of the metal body will be sufficiently even and the metal body will retain its original cross section. The cutting device 5 can also be constructed in such a manner that the part receiving the metal bar is divided in which case the metal bar is contained in a device having upper and lower jaws.

Figure 2:
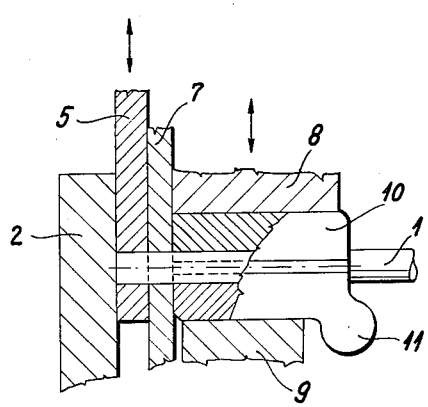
FIGURE 2 shows a possible form of the device for loading the metal bar for use in the arrangement shown in FIGURE 1.

In FIGURE 2 there is shown a detail of the device in which the loading of the metal bar and the maintenance of the load during cutting is carried out by a single device. In the embodiment shown in the drawing this is carried out by the device 10 which serves for initially applying the load and maintaining the load. The device 10 shown in the drawing is divided and its lower part has an elongated lower part serving as a pinion bearing for a pinion 11 about which the whole device 10 can rotate. The lower part of the device 10 is supported on the block 9 while its upper part has a loading part 8. Between the loading and load maintaining device 10, on the one hand, and the cutting device 5 there is a stationary plate 7. The device 10 is provided with annular grooves of wedge-shaped cross section on its faces which engage the metal bar 1. The distance apart of the grooves is equal to the length of the metal body to be cut. During cutting the load maintaining device 8 presses against the load applying device 10 so that the device 10 presses against the metal bar and as the pressure is increased turns somewhat about the pin 11 of the pin bearing or attempts to turn in this manner while, on the other hand, the metal bar 1 being gripped presses against the abutment plate 2. In other words, the device 8 urges device 10 to swing counterclockwise about pin 11; and device 10 thus transmits this force to bar 1 by the reaction of plate 2 against bar 1. Then the cutting device 5 is moved downwards and the part of the bar moves in the hole or recess of the cutting device 5 along the plane between the devices 5 and 7 and it is cut in a manner as described in connection with FIGURE 1 above. When the pressure applied by the part 8 is discontinued and when the cutting part 5 has been returned to its position shown in the drawing, the metal bar 1 is advanced through the hole of the stationary plate 7 and through the hole or recess of the cutting device 5 as far as the abutment plate 2 so that the bar can be cut again.

The device 10 for the application and maintenance of the load can be constructed in such a manner that during the loading of the bar to be cut to produce the load to be maintained, the bar does not attempt to turn but attempts to move or actually moves a small amount along its axis. In the case of such an embodiment the load maintaining device 10 is provided with a guide track and we make use of a load maintaining part (for use with the part 10) which is wedge-shaped. As a consequence of this the load transmitted by the part also possesses an axial component which results in a loading of the bar to be cut.

In an arrangement in accordance with FIGURE 1 or FIGURE 2 a mechanical or a hydraulic source of power can find application for the production of the load as well as for actuating the cutting device. The device can be also constructed with a single source of power for bringing about the loading and the cutting.

In all embodiments it is possible to use several cutting devices: in this case the stationary and the movable cutting devices 5 follow each other in alternate sequence. The stationary cutting device can also be replaced by movable cutting devices moving some time after the adjacent cutting devices.

Figure 3:
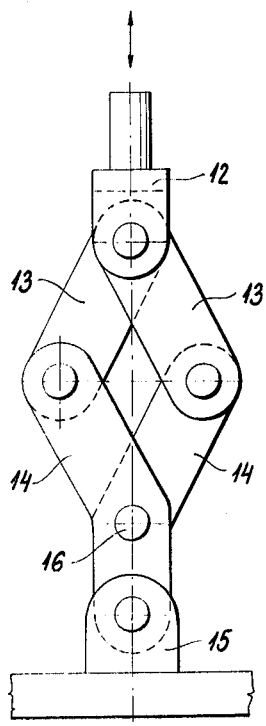
FIGURE 3 shows a mechanical cutting up device for use in the embodiment shown in FIGURE 1.
Figure 4:
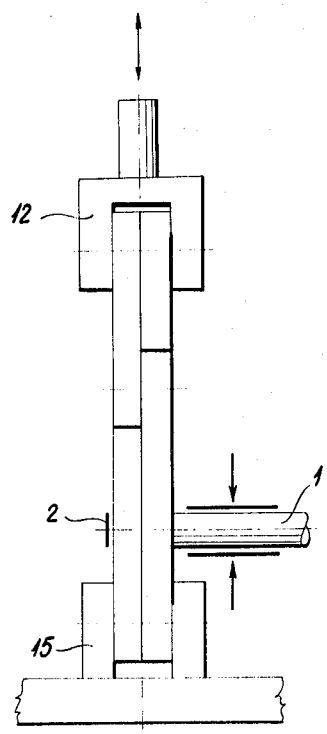
FIGURE 4 is a front view of the device in accordance with FIGURE 3.

FIGURES 3 and 4 show schematically such a device in which the cutting devices during operation move along circular arcs. In this embodiment the cutting arms 14 are mounted so that they pivot about a bolt mounted or journalled in a fork 15, while the upper ends of the arms 13 pivot together. The upper ends of the transmission arms 13 and 14 can also turn about a bolt fixed in the fork 12. In the embodiment shown in the drawing the upper fork 12 is the transmission device for the load. The holes 16 in the arms 14 whose axes correspond in a particular position of these arms, serve for receiving the metal bar 1 to be cut. The device serving for the holding and loading of the bar to be cut up is shown in FIGURE 4 only schematically and can be constructed in any desired manner. The loading device presses the metal bar 1 against the abutment plate, which is also schematically shown, with such a force that its material undergoes cold plastic deformation and the arms 14, acted on by a force applied to the fork 12, are turned apart and sever the metal body enclosed in their holes 16. After a corresponding turning of the arms ejector rods (not shown in the drawing) push the metal bodies from the holes 16. Then the parts are returned to their original positions by an upward force applied to the fork 12 and the metal bar 1 is then advanced as far as the abutment plate 2 so that the severing of new metal bodies can be commenced.

Also in the devices shown in FIGURES 3 and 4 which employs a shearing cutting device it is possible to arrange several pairs of cutting arms beside each other so as to be driven from the common fork 12. It is of course possible in this case to use a common source of power for pressing the form 12 and for loading the metal rod. The source of power for this purpose can be a hydraulic or mechanical one.

The devices already described comprise a stationary abutment plate but instead it is also possible to use a device which during the cutting is loaded so as to press the metal bar 1 in its longitudinal direction or in a direction parallel to its axes in order to maintain the state of cold plastic deformation.

A device equipped with means for producing loads from two sides at once can also be made with bell cranks for exerting the load. In such an embodiment of the invention a bar must be put under a load between the jaws of the bell cranks and these jaws should have a length which is equal to the sum of the metal bodies produced during the application of the method. In order to carry out the process of cutting up, the bar is set in the bores or recesses of the stationary and/or the movable cutting devices 5 and the two loading jaws in the form of bell cranks are pressed together and the cutting device is actuated. The bell-crank-like jaws close in the manner of a pair of pincers onto the metal bar and hold it so as to be capable of resisting forces in two opposite directions so as to produce an axial loading. The actuation of the bell crank lever jaws can also be carried out by a common device. When cutting up long bars it is an advantage if the load maintaining jaws of the bell crank levers do not abut immediately against the ends of the metal bar to be cut up but the jaws should transfer the load by means of transmission parts to the ends of the bar. In this manner there is produced a relative movement between the jaws and the transmission parts while there is no relative movement between the transmission parts and the ends of the metal bar; consequently the friction produced during the further movement does not influence the cutting up process.

The cutting process in accordance with the invention can also be provided, for example, with a manually driven advancing device, advantageously one which is connected with the cutting device and/or the loading means of the machine or with the actuating parts of this machine so as to be driven positively, for instance hydraulically or mechanically. The positive connection should be so constructed that after the end of the cutting process, when the cutting device is back in its original position, the metal bar to be cut up is advanced as far as the abutment plate.

Such a feed or advancing device working intermittently can also fulfill the role of a loading device and also serve to maintain the load.

What we claim is:

1. A process for the cutting up of metal bars, comprising applying to the metal bar to be cut up, at least in the length of it which is to be cut, during the cutting, a compressive force which is at least equal to the force necessary to cause plastic flow and acting parallel to the longitudinal axis of the bar, and shearing the metal bar so loaded into pieces along at least one plane which is perpendicular to the longitudinal axis of the metal bar.

2. A process according to claim 1 in which the necessary load in the metal bar to be cut up is produced by means of forces acting simultaneously in different directions.

3. Apparatus for cutting up metal bars, comprising means for applying to the metal bar to be cut up a compressive force which is at least equal to the force necessary to cause plastic flow and which is directed parallel to the longitudinal axis of the bar, and means for shearing the metal bar so loaded into pieces along at least one plane which is perpendicular to the longitudinal axis of the metal bar.

4. Apparatus as claimed in claim 3, said means for applying a compressive force to the bar comprising a fixed abutment, a device for urging the bar against said fixed abutment, means mounting said urging device for swinging movement toward and away from said abutment about an axis perpendicular to the axis of the bar to be cut, and means for swinging said urging device about said axis in a direction to force the bar against the abutment.

5. Apparatus as claimed in claim 3, said shearing means comprising a pair of shearing arms mounted for rotation in opposite directions about an axis parallel to said axis of the bar.

References Cited by the Examiner

UNITED STATES PATENTS

| | | | |
|---|---|---|---|
| 817,598 | 4/1906 | Stople | 83—604 X |
| 2,039,840 | 5/1936 | Howland-Shearman | 83—14 |
| 2,039,841 | 5/1936 | Howland-Shearman | 83—14 |
| 2,136,831 | 11/1938 | Vuilleumier | 83—198 X |
| 2,643,403 | 6/1953 | MacBlane et al. | 83—198 X |
| 2,740,472 | 4/1956 | Eckstein et al. | 83—198 X |
| 2,855,627 | 10/1958 | Prentiss | 83—198 X |

FOREIGN PATENTS 122,178 7/1901 Germany.

WILLIAM W. DYER, JR., *Primary Examiner.*

J. M. MEISTER, *Assistant Examiner.*